(12) United States Patent
Watanabe et al.

(10) Patent No.: US 8,259,079 B2
(45) Date of Patent: Sep. 4, 2012

(54) INPUT PANEL HAVING FLEXIBLE CIRCUIT BOARD INSERTED INTO PASSAGE THROUGH BASE AND INPUT DEVICE HAVING THE INPUT PANEL

(75) Inventors: Takeshi Watanabe, Fukushima-ken (JP); Naohisa Masuda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 688 days.

(21) Appl. No.: 11/762,555

(22) Filed: Jun. 13, 2007

(65) Prior Publication Data

US 2007/0291963 A1 Dec. 20, 2007

(30) Foreign Application Priority Data

Jun. 14, 2006 (JP) .................................. 2006-164863

(51) Int. Cl.
*G06F 3/041* (2006.01)
(52) U.S. Cl. ........................................................ 345/173
(58) Field of Classification Search .......... 345/173–179; 349/58, 110, 149; 178/18.01; 439/495
See application file for complete search history.

(56) References Cited

U.S. PATENT DOCUMENTS

| | | | |
|---|---|---|---|
| 7,554,624 B2 | 6/2009 | Kusuda et al. | |
| 2002/0089493 A1* | 7/2002 | Hong | 345/173 |
| 2005/0286008 A1* | 12/2005 | Miyagawa et al. | 349/158 |
| 2006/0125981 A1* | 6/2006 | Okuda | 349/110 |
| 2006/0141854 A1* | 6/2006 | Gushiken | 439/495 |
| 2007/0103446 A1* | 5/2007 | Chien et al. | 345/173 |

FOREIGN PATENT DOCUMENTS

| | | |
|---|---|---|
| JP | 2001-168546 | 6/2001 |
| JP | 2003-157150 | 5/2003 |
| JP | 2008-21304 | 1/2008 |
| WO | WO 2005064451 A1 | 7/2005 |

OTHER PUBLICATIONS

Office Action issued in corresponding Japanese Patent Application No. 2007-157376, mailed Jun. 21, 2011.

* cited by examiner

*Primary Examiner* — Chanh Nguyen
*Assistant Examiner* — Sanghyuk Park
(74) *Attorney, Agent, or Firm* — Brinks Hofer Gilson & Lione

(57) ABSTRACT

A thin input device with a flat input side surface is provided in which a flexible circuit board is disposed inside a chassis so as to extend to the outside or inside of the chassis while preventing the flexible circuit board from bending awkwardly. An opening for exposing a portion of a bottom surface of an input panel is formed on a bottom wall of the chassis. A through-hole for guiding the flexible circuit board to the anti-input side of the input panel is formed on a second base disposed on the anti-input side so that the through-hole is inside a first base disposed on the input side at a position corresponding to the opening. The flexible circuit board is disposed to extend to the outside or inside of the chassis through the through-hole.

6 Claims, 3 Drawing Sheets

INPUT PANEL HAVING FLEXIBLE CIRCUIT BOARD INSERTED INTO PASSAGE THROUGH BASE AND INPUT DEVICE HAVING THE INPUT PANEL

CLAIM OF PRIORITY

This application claims the benefit of Japanese Patent Application No. 2006-164863, filed on Jun. 14, 2006, the entire contents of which are incorporated herein by reference.

BACKGROUND

1. Field of the Invention

The present invention relates to an input device, more particularly, to an input device in which an input panel connected to a flexible circuit board is received in a chassis.

2. Description of the Related Art

Recently, input panels, such as touch panels or tablets, enabling the input of data with approaching or contacting input means, such as pen-shaped writing instruments or fingertips, have been widely used as data input means of electronic apparatuses, such as PDAs (Personal Digital Assistant) or game machines.

As a method of detecting coordinate information so as to input data to the input panel, there have been known various methods of various types including resistor film, electromagnetic induction, electrostatic, ultrasonic, and optical methods. FIG. 6 is a schematic sectional view illustrating an example of a known input device having a resistor film type input panel. As shown in FIG. 6, a pair of bases 28 and 29 having the same planar size are opposed relative to each other in an input panel 24 with a predetermined gap. In the inner surfaces of the bases 28 and 29, which are opposed to each other, a plurality of electrodes (not shown) are formed by a resistor film made of a light-transmitting material. Each of the electrodes is formed to extend from one end of the second base 29 that is disposed on the anti-input side of the input panel 24 and serves as an electrode terminal.

In addition, when a predetermined portion of the first base 28 disposed on the input side of the input panel 24 is pressed by a writing instrument (not shown), the first base 28 is bent so that the resistor film of the first base 28 comes in contact with the electrodes of the second base 29 disposed on the anti-input side. The input panel 24 detects coordinate information of the contact point by a resistance ratio between two electrodes at the contact point, and data based on the coordinate information is input to the input device.

The input panel 24 is connected to a flexible circuit board 32 that supplies electric power to the electrodes of the input panel 24. The flexible circuit board 32 is disposed between the bases 28 and 29, and the electrodes of the flexible circuit board 32 are electrically connected to the electrode terminal of the input panel 24.

An input device 23 includes a chassis 21 for receiving the input panel 24. The chassis 21 includes a side wall 25 opposed to the side surfaces of the input panel 24, a top wall 22 opposed to an outer peripheral edge of the top surface of the input side to press the top surface of the input panel 24, and a bottom wall 31 opposed to a bottom surface of the anti-input side to support the input panel 24. An opening 31a for exposing the central portion of the bottom surface in the input panel 24 to the outside is formed on the bottom wall 31. In addition, the chassis 21 receives the input panel 24 in its inner space (see JP-A-2003-157150 for reference).

In the input device 23, the flexible circuit board 32 connected to one end of the input panel 24 is bent along a front end 29a of the second base 29 in the inside of the chassis 21 so that the flexible circuit board 32 is inserted between the front end 29a of the second base 29 and the side wall 25 of the base 21. In addition, the flexible circuit board 32 extends along between the bottom wall 31 of the chassis 21 and the bottom surface of the input panel 24 while being inserted. Then, the flexible circuit board 32 is bent along an opening edge of the opening 31a of the bottom wall 31 and extends to the outside of the chassis 21.

With the recent trend toward small and thin electronic apparatuses such as game machines having the above-mentioned input device 23, it may be desired to decrease the thickness of the input device 23 itself. Accordingly, an attempt has been made to realize the small-thickness of the input device 23 by eliminating the top wall 22 of the chassis 21.

However, in the above-mentioned input device 23, the flexible circuit board 32 is inserted between the front end 29a of the second base 29 and the side wall 25 of the chassis 21. If the top wall 22 of the chassis 21 is not formed, the flexible circuit board 32 can be seen from the input side. Accordingly, by only eliminating the top wall 22, it is difficult to manufacture the input device 23 with small thickness and planarize the input device 23 to have a flat surface.

In addition, because the flexible circuit board 32 is disposed to extend to the outside or inside of the chassis 21, the flexible circuit board 32 is complicatedly bent while being inserted between the chassis 21 and the input panel 24. In this way, when the flexible circuit board 32 is complicatedly bent several times, the bending portion of the flexible circuit board 32 is easily fatigued. That is, the flexible circuit board 32 may experience disconnection of electrodes as well as other problems.

BRIEF SUMMARY

According to a first aspect, an input device includes an input panel having a pair of bases and a plurality of electrodes disposed on both surfaces of the bases so as to be opposed to each other. A chassis has a side wall opposed to a side surface of the input panel and a bottom wall opposed to a bottom surface on an anti-input side of the input panel. The chassis is configured to receive the input panel. A flexible circuit board is connected to the bases and electrically connected to the electrodes. A passage for guiding the flexible circuit board to the anti-input side of the input panel is provided on the base disposed on the anti-input side of the bases so that the passage is inside the base disposed on the input side of the bases when viewed in a plan view. The flexible circuit board extends to the outside or inside of the chassis through the passage.

According to a second aspect, the passage includes a through-hole, and the flexible circuit board extends to the outside or inside of the chassis through the through-hole.

According to a third aspect, an opening for exposing a portion of the bottom surface of the input panel is provided at the bottom wall, and the passage is provided at a position corresponding to the opening.

According to a fourth aspect, the passage includes a notch groove provided at one end of the anti-input side base, and the flexible circuit board extends to the outside or inside of the chassis through the notch groove.

According to a fifth aspect, the opening edge of the passage through which the flexible circuit board passes has a curved section.

Other systems, methods, features, and advantages of the invention will be, or will become, apparent to one with skill in the art upon examination of the following figures and detailed description. It is intended that all such additional systems, methods, features, and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DESCRIPTION OF THE PREFERRED EMBODIMENTS

An embodiment of an input device will be described with reference to FIGS. 1 and 2.

In the embodiment, an input panel having a resistor film type is described. However, the input panel of the invention is not restricted to this embodiment.

Figure 1:
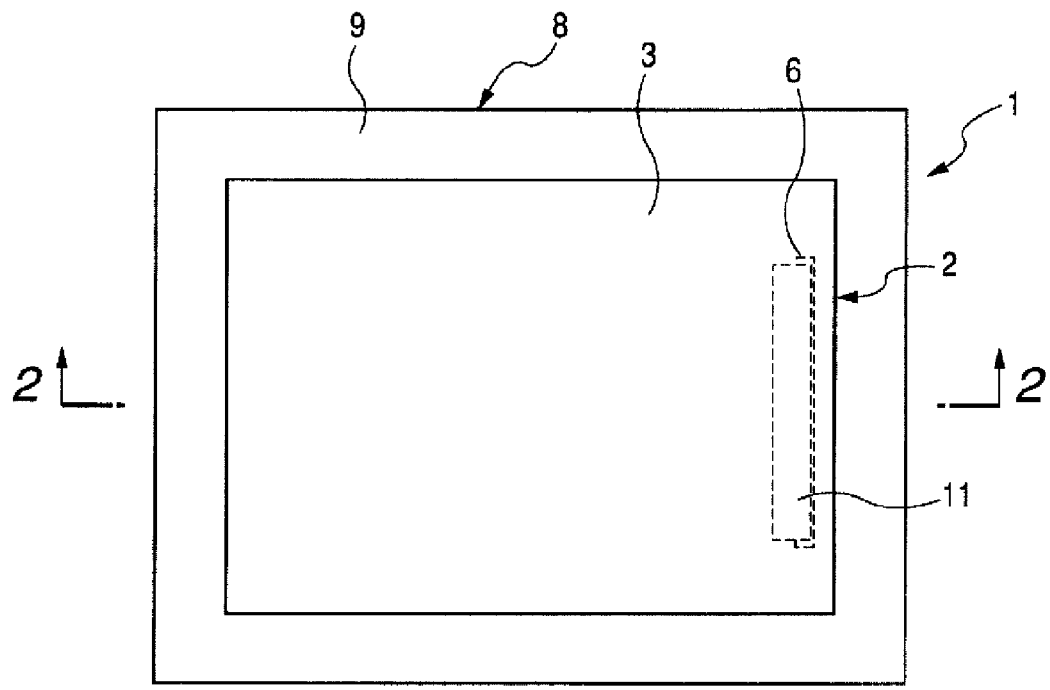
FIG. 1 is a schematic plan view illustrating an input device according to an exemplary embodiment.

FIG. 1 is a schematic plan view illustrating the input device according to the embodiment. FIG. 2 is a sectional view when viewed from the line 2-2 of FIG. 1.

Figure 2:
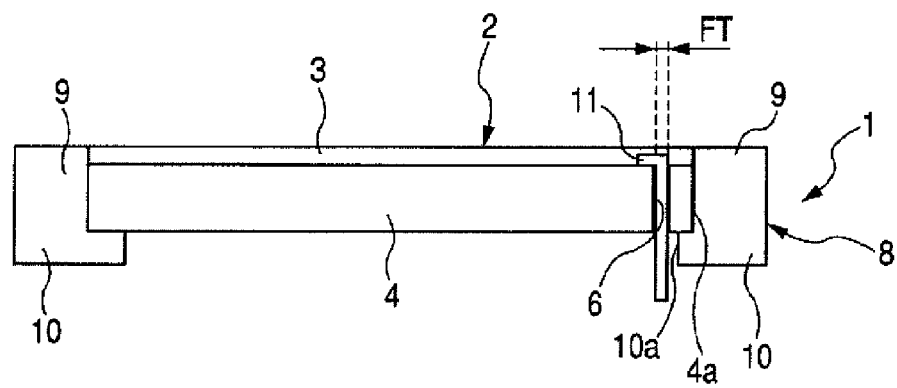
FIG. 2 is a sectional view illustrating the input device of FIG. 1 when viewed from the line 2-2.

As shown in FIGS. 1 and 2, the input device 1 according to the embodiment includes a touch panel 2. The touch panel 2 includes a pair of bases 3 and 4 that are made of a light-transmitting material having the same planar size. The first base 3 inputted to an input side among the bases 3 and 4 is formed by a flexible thin film having material such as polyester. The second base 4 disposed on the anti-input side is formed of a substrate made of transparent resin material such as glass or acryl. The bases 3 and 4 are opposed to each other with a predetermined gap and are formed integrally through a bonding layer (not shown) disposed in an outer peripheral edge of an inner surface of the first base 3.

In the inner surfaces in which the bases 3 and 4 are opposed to each other, a plurality of electrodes (not shown) is formed of a resistor film made of a light-transmitting material such as indium oxide. Each of the electrodes is formed to extend from one end of the second base 4 and serves as an electrode terminal.

In addition, when a predetermined portion of the first base 3 disposed in the input side in the input panel 2 is pressed using a writing instrument, a finger, or the like (which are not shown), the first base 3 is bent so that the electrode formed at the first base 3 comes in contact with electrodes of the second base 4. The coordinate information is detected by a resistance ratio between two electrodes in the contact point and data is inputted in accordance with the coordinate information.

In the touch panel 2, the flexible circuit board 11 (used to apply the voltage for detecting the coordinate to the electrode through the electrode terminal) is disposed between the bases 3 and 4. Accordingly, the flexible circuit board 11 is connected to one end of the second base 4. An electrode (which is not shown) in the flexible circuit board 11 is electrically connected to the electrode terminal of the touch panel 2.

In addition, the input device 1 includes a chassis 8 formed of resin material receiving the touch panel 2. The chassis 8 includes a first base 3 that is a side surface of the touch panel 2, and a side wall 9 opposed to a bonding layer and all of the side surface of the second base 4. A bottom wall 10 is opposed to the bottom wall supporting the touch panel 2, which is disposed in the surface of the anti-input side of the second base 4. The side wall 9 and the bottom wall 10 are formed integrally. The bottom wall 10 is disposed in the outer edge of the bottom surface of the touch panel 2, and an opening 10a exposing the central portion of the bottom surface in the bottom wall 10 is formed. In addition, the touch panel 2 may be received in the inside of the chassis 8.

In the input device 1, a through-hole 6 is formed as a passage in which the flexible circuit board 11 can be passed in a position such that the flexible circuit board 11 is connected and corresponds to the opening 10a of the bottom wall 10 of the chassis 8. The opening edge of the inner surface of the second base 4 of the through-hole 6 has a curved section. Therefore, when the flexible circuit board 11 passes through the through-hole 6, a corner portion is contacted with the flexible circuit board 11. With such a configuration, it is possible to allow the flexible circuit board 11 to pass the through-hole 6 and prevent disconnection of wires of the flexible circuit board 11 at the contact portion. In addition, the flexible circuit board 11 connected to one end of the second 4 is bent along the opening edge of the through-hole 6 of the second base 4 so as to pass the through-hole 6. The flexible circuit board 11 extends to the outside of the chassis 8 through the opening 10a of the bottom wall 10 of the chassis 8.

Figure 3:
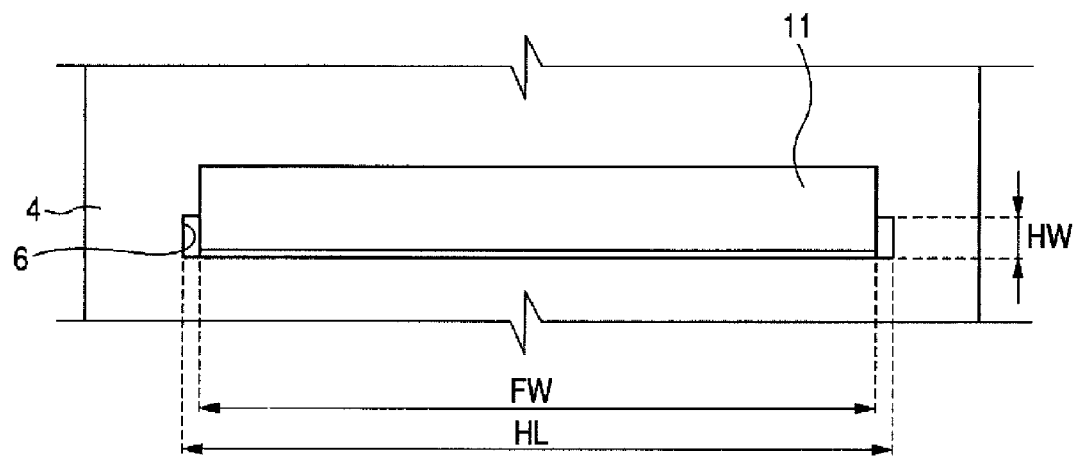
FIG. 3 is a schematic plan view illustrating a main part of an anti-input side base in the input device of FIG. 1.

In the embodiment, as shown in FIGS. 2 and 3, when the flexible circuit board 11 having the thickness FT in the range of about 0.1 to about 0.2 mm is used, a width HW of the through-hole 6 corresponding in size to a thickness FT of the flexible circuit board 11 is preferably set to the thickness FT of the flexible circuit board 11, such as about 0.1 to about 0.2 mm. When the flexible circuit board 11 having the width FW in the range of about 2 to about 15 mm is used, a length HL of the through-hole 6 corresponding in size to the width FW of the flexible circuit board 11 is preferably set to the width FW of the flexible circuit board 11, such as about 0.1 to about 1.0 mm. With such a configuration, the flexible circuit board 11 can easily pass the through-hole 6.

Next, an operation of the first embodiment will be described.

According to the embodiment, the flexible circuit board 11 extends to the anti-input side of the touch panel 2 through the through-hole 6 of the second base 4. With such a configuration, the flexible circuit board 11 can extend to the outside of the chassis 8 through the opening 10a of the bottom wall 10 in the chassis 8 without bending the flexible circuit board 11 along a front end surface 4a in one end of the second base 4 and without disposing the flexible circuit board 11 to the outside in the plan view of the first base 3.

With such a configuration, the flexible circuit board 11 is disposed in the outside of the chassis 8 without disposing the flexible circuit board 11 to the outside in the plan view of the first base 3. Accordingly, even when the top wall of the chassis 8 is not formed, the flexible circuit board 11 is not observed from the input side of the input device 1. Because the touch panel 2 may be received by the chassis 8, which does not include the top wall, it is possible to manufacture the input device 1 itself with small thickness and planarize the input device 1 to have a flat input side surface.

In addition, the through-hole 6 is formed at a position that corresponds to the opening 10a of the bottom wall 10 and may be disposed to the outside of the chassis 8 without inserting the flexible circuit board 11 between the side wall 9 of the chassis 8 and the leading end surface 4a of the second base 4. With such a configuration, it is possible to dispose the flexible circuit board 11 to the outside of the chassis 8 without bending complicatedly the flexible circuit board 11. Accordingly, it is possible to prevent disconnection of wires by fatigue of the flexible circuit board 11 and increase life span of the input device 1.

Because the opening edge of the through-hole 6 has a curved section, the flexible circuit board 11 may be bent in the opening edge of the through-hole 6 without damage. Accordingly, it is possible to prevent disconnection of wires of the electrode by fatigue of the flexible circuit board 11.

Next, the input device according to a second embodiment will be described with reference to FIGS. 4 and 5.

In the second embodiment, the corresponding parts to the first embodiment are indicated by the same reference numerals and the detailed description is omitted.

Figure 4:
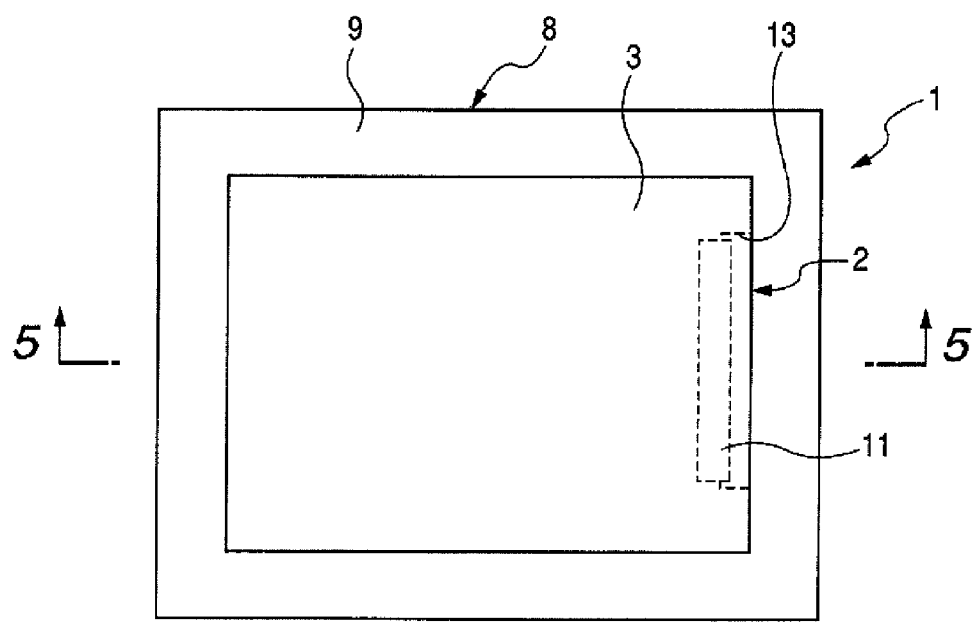
FIG. 4 is a schematic plan view illustrating a main part of the input device according to another exemplary embodiment.

FIG. 4 is a schematic plan view illustrating the input device 1 according to the second embodiment. FIG. 5 is a sectional view illustrating the input device 1 of FIG. 4 when viewed from the line 5-5.

Figure 5:
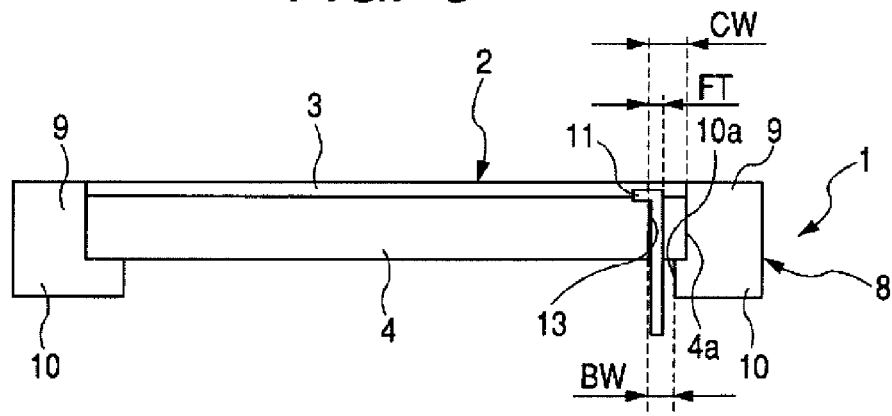
FIG. 5 is a sectional view illustrating the input device of FIG. 4 when viewed from the line 5-5.
Figure 6:
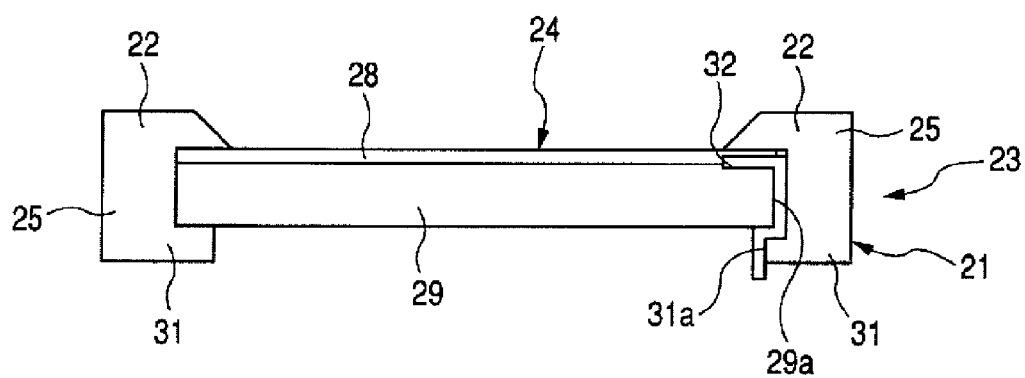
FIG. 6 is a schematic sectional view illustrating an example of a known input device.

As shown in FIGS. 4 and 5, in one end of the second base 4, a notch groove 13 is formed at a leading end surface 4a of one end of the second base 4 as a passage capable of allowing the flexible circuit board 11 to be passed. The opening edge of the inner surface of the second base 4 of the notch groove 13 (i.e., a corner portion in which the flexible circuit board 11 is contacted) has a curved section. With such a configuration, it is possible to pass the flexible circuit board 11 through the notch groove 13 and prevent disconnection of wires of the flexible circuit 11 at the contact portion. It is preferable that a notched length CW in the notch groove 13 is formed so that a gap BW from the opening edge of the opening 10a to the opening edge of the notch groove 13 is more than the thickness FT of the flexible circuit board 11.

In addition, the flexible circuit board 11 connected to one end of the second base 4 is bent along the opening edge of the notch groove 13 of the second base 4 through the notch groove 13. Also, the flexible circuit board 11 is disposed to extend to the outside of the chassis 8 through the opening 10a in the bottom wall 10 of the chassis 8.

Next, an operation of the second embodiment will be described.

According to the second embodiment, by disposing the flexible circuit board 11 through the notch groove 13 of the second base 4 to the anti-input side of the touch panel 2, the flexible circuit board 11 may be disposed to the outside of the chassis 8 through the opening 10a without bending the flexible circuit board 11 along the leading end 4a (in the one end of the second base 4) and without disposing the flexible circuit board 11 to the outside in a plan view of the first base 3.

With such a configuration, by disposing the chassis 8 to the outside without disposing the flexible circuit board 11 to the outside in the plan view of the first base 3, the flexible circuit board 11 is not observed from the input side of the input device 1 when the top wall of the chassis 8 is not formed. Accordingly, because the touch panel 2 can be received by the chassis 8, which does not have the top wall, it is possible to manufacture the input device 1 with small thickness and planarize the input device 1 itself to have a flat surface.

In addition, the notched length CW in the notch groove 13 is formed to allow for a gap from the opening edge of the opening 10a to the opening edge of the notch groove 13. It is possible to dispose the flexible circuit board 11 to the outside of the chassis 8 without bending complicatedly the flexible circuit board 11. With such a configuration, it is possible to prevent disconnection of wires by fatigue of the flexible circuit board 11 and increase life span of the input device 1.

The opening edge of the notch groove 13 has a curved section. Accordingly, the flexible circuit board 11 can be bent in the opening edge of the notch groove 13 without damage and it is possible to prevent disconnection of wires by fatigue of the flexible circuit board 11.

The invention is not restricted to the embodiments. Various modifications can be made.

For example, in the above-described embodiment, the second base 4 is set to the same size as the first base 3 in the plan view. However, the second base 4 may be smaller in size than the first base 3 in the plan view.

Also, in the above-described embodiments, the flexible circuit board 11 is disposed to extend to the outside of the chassis 8 through the through-hole 6 and the notch groove 13. However, the flexible circuit board 11 may extend to the inside of the chassis 8 through the through-hole 6 or the notch groove 13.

One object of the invention is to provide a thin input device having a flat input side surface.

As described above, the flexible circuit board is disposed to extend to the anti-input side of the input panel through the passage formed on the anti-input side base. Accordingly, it is possible to dispose the flexible circuit board so as to extend to the outside or inside of the chassis while preventing the flexible circuit board from being disposed outside the input side base when viewed in a plan view thereof.

As described above, the flexible circuit board is disposed in the anti-input side of the input panel through the through-hole formed on the anti-input side base. Accordingly, it is possible to dispose the flexible circuit board so as to extend to the outside or inside of the chassis while preventing the flexible circuit board from being disposed outside the input side base when viewed in a plan view thereof.

The through-hole is formed in the bottom wall at a position corresponding to the opening. Accordingly, it is possible to dispose the flexible circuit board so as to extend to the outside or inside of the chassis while preventing the flexible circuit board from bending complicatedly. With such a configuration, it is possible to suppress disconnection in the flexible circuit board due to fatigue and thus increase life span of the input device.

As described above, the flexible circuit board is disposed in the anti-input side of the input panel through the notch groove formed on the anti-input side base. Accordingly, it is possible to dispose the flexible circuit board so as to extend to the outside or inside of the chassis while preventing the flexible circuit board from being disposed outside the input side base when viewed in a plan view thereof.

It is possible to bend the flexible circuit board at the opening edge of the passage without damage. Accordingly, it is possible to further suppress disconnection in the flexible circuit board due to fatigue.

As mentioned above, it is possible to dispose the flexible circuit board so as to extend to the outside or inside of the chassis while preventing the flexible circuit board from being disposed outside the input side base when viewed in a plan view thereof. Accordingly, when the top wall is not formed, the flexible circuit board is not observed from the input side of the input device. With such a configuration, because the input panel can be received in the chassis in which the top wall is not formed, it is possible to manufacture the input device itself with small thickness while planarizing its input side surface.

It is intended that the foregoing detailed description be regarded as illustrative rather than limiting, and that it be understood that the following claims, including all equivalents, are intended to define the scope of this invention.

What is claimed is:

1. An input device comprising:
   an input panel having a first base disposed on an input side, a second base disposed on an anti-input side so as to be opposed to the first base with a predetermined gap therebetween, and electrodes formed on inner surfaces, which oppose each other, of the first base and the second base;
   a chassis having a side wall opposed to a side surface of the input panel and a bottom wall opposed to a bottom surface on the anti-input side of the input panel, an opening for exposing a portion of the bottom surface of the input panel is provided at the bottom wall, the chassis configured to receive the input panel; and
   a flexible circuit board having one end disposed between the first base and the second base and electrically connected to the electrodes,
   wherein the second base includes an inner surface opposed to the first base and an outer surface on the anti-input side opposed to the inner surface, the second base includes a passage formed through the inner surface and the outer surface, the flexible circuit board has an intermediate portion which is continued from the one end and inserted into the passage, and an other end which continued from the intermediate portion and disposed closer to the anti-input side than the outer surface of the second base, and the passage of the second base is formed inside an outer peripheral edge of the first base and inside an inner peripheral edge of the opening of the chassis;
   wherein the first base and an upper surface of the side wall of the chassis are coplanar;
   wherein the passage is formed to be larger than the width of the flexible circuit board and to be larger than the thickness of the flexible circuit board; and
   wherein an opening edge is formed at a boundary between the inner surface of the second base and the passage, and the opening edge of the passage through which the flexible circuit board passes has a curved section, the curved section of the opening edge being opposed to the flexible circuit board.

2. The input device according to claim 1, wherein the passage includes a through-hole.

3. The input device according to claim 1, wherein the passage includes a notch groove provided at one end of the anti-input side base.

4. An input panel comprising:
   a first base disposed on an input side;
   a second base disposed on the anti-input side so as to be opposed to the first base with a predetermined gap therebetween;
   electrodes formed on inner surfaces, which oppose each other, of the first base and the second base; and
   a flexible circuit board having one end disposed between the first base and the second base and electrically connected to the electrodes,
   wherein the second base includes the inner surface opposed to the first base and an outer surface on the anti-input side opposed to the inner surface, the second base includes a passage formed through the inner surface and the outer surface, the flexible circuit board has an intermediate portion which is continued from the one end and inserted into the passage and an other end which continued from the intermediate portion and disposed closer to the anti-input side than the outer surface of the second base, and the passage of the second base is formed inside an outer peripheral edge of the first base;
   wherein the first base and an upper surface of the side wall of the chassis are coplanar; and
   wherein the passage is formed to be larger than the width of the flexible circuit board and to be larger than the thickness of the flexible circuit board; and
   wherein an opening edge is formed at a boundary between the inner surface of the second base and the passage, and the opening edge of the passage through which the flexible circuit board passes has a curved section, the curved section of the opening edge being opposed to the flexible circuit board.

5. The input device according to claim 4, wherein the passage includes a through-hole.

6. The input device according to claim 4, wherein the passage includes a notch groove provided at one end of the anti-input side base.

* * * * *